(12) United States Patent
Sakai et al.

(10) Patent No.: US 6,950,449 B2
(45) Date of Patent: Sep. 27, 2005

(54) PASSIVELY Q-SWITCHED LASER

(75) Inventors: Hiroshi Sakai, Hamamatsu (JP);
Akihiro Sone, Hamamatsu (JP);
Hirofumi Kan, Hamamatsu (JP);
Takunori Taira, Okazaki (JP)

(73) Assignee: Hamamatsu Photonics K.K., Shizuoka (JP)

( * ) Notice: Subject to any disclaimer, the term of this patent is extended or adjusted under 35 U.S.C. 154(b) by 0 days.

(21) Appl. No.: 10/237,090

(22) Filed: Sep. 9, 2002

(65) Prior Publication Data

US 2003/0063630 A1 Apr. 3, 2003

(30) Foreign Application Priority Data

Sep. 10, 2001 (JP) .................................... P2001-274025

(51) Int. Cl.[7] .................................................. H01S 3/11
(52) U.S. Cl. ............................ 372/10; 372/21; 372/22; 372/17; 359/330
(58) Field of Search ............................. 372/10, 21, 22, 372/101, 41, 75; 359/330

(56) References Cited

U.S. PATENT DOCUMENTS

| | | | | |
|---|---|---|---|---|
| 5,281,211 A | * | 1/1994 | Parel et al. | 606/5 |
| 5,528,611 A | * | 6/1996 | Scheps | 372/14 |
| 5,841,099 A | * | 11/1998 | Owen et al. | 219/121.69 |
| 5,844,149 A | * | 12/1998 | Akiyoshi et al. | 73/864.81 |
| 5,858,822 A | * | 1/1999 | Yamazaki et al. | 438/166 |
| 5,892,614 A | * | 4/1999 | Asaba | 359/330 |
| 5,907,570 A | * | 5/1999 | Nighan et al. | 372/41 |
| 6,526,089 B1 | * | 2/2003 | Haeno et al. | 372/101 |

FOREIGN PATENT DOCUMENTS

JP 2000-101175 4/2000

* cited by examiner

*Primary Examiner*—Minsun Oh Harvey
*Assistant Examiner*—Dung Nguyen
(74) *Attorney, Agent, or Firm*—Drinker Biddle & Reath LLP

(57) ABSTRACT

The present passively Q-switched laser comprises a condensing optical system for condensing a laser beam emitted from a laser light source onto the surface of the solid-state laser medium. The surface of a solid-state laser medium is disposed off the condensation position of the laser beam produced by the condensing optical system.

3 Claims, 6 Drawing Sheets

PASSIVELY Q-SWITCHED LASER

BACKGROUND OF THE INVENTION

1. Field of the Invention

The present invention relates to a passively Q-switched laser.

2. Description of the Related Art

A conventional device comprises a solid-state laser medium disposed between a pair of reflective mirrors that constitute a resonator, a host crystal for absorbing the fluorescence generated from the solid-state laser medium in the resonator and increasing transmittance in accordance with the absorption, a semiconductor laser for emitting a laser beam that excites the solid-state laser medium, and a condensing optical system for condensing the laser beam emitted from the semiconductor laser onto the surface of the solid-state laser medium.

When the host crystal absorbs a laser beam from the semiconductor laser, the electron density of the excitation levels in the host crystal gradually increases, and because the excitation levels become filled at one point, the electron density is saturated, transparency is achieved, the Q-value of the resonance increases, and the passively Q-switched laser outputs a laser beam.

A conventional passively Q-switched laser is disclosed in Japanese Patent Application Laid-Open No. 2000-101175.

SUMMARY OF THE INVENTION

However, the laser beam output of a conventional passively Q-switched laser has a low peak intensity at about 12 kW, and in technical fields such as optical communications, further improvements in passively Q-switched lasers are being sought after because of the need to achieve increased peak intensities in optical communication and other technological fields. With the foregoing in view, it is an object of the present invention to provide a passively Q-switched laser capable of increasing the peak intensity of a laser beam output.

In conventional practice, increasing the intensity of a laser beam emitted from a semiconductor laser has been thought to be the equivalent of increasing the temporal peak intensity of a laser beam outputted from a passively Q-switched laser. Consequently, in order to improve the spatial peak intensity of laser beam output in a conventional passively Q-switched laser, it has been standard practice to minimize the thickness of the laser beam emitted from a condensing optical system and to direct the beam to the surface of a solid-state laser medium.

In practice, however, adopting such techniques merely leads to a reduction in the pulse interval of the outputted laser beam and fails to increase the peak intensity (pulse energy) of the laser beam outputted from a passively Q-switched laser (see FIG. 6).

Therefore, the passively Q-switched laser of the present invention comprises a solid-state laser medium disposed between a pair of reflective mirrors that constitute a resonator, a host crystal for absorbing the fluorescence generated from the solid-state laser medium in the resonator and increasing transmittance in accordance with the absorption, a laser light source for emitting a laser beam that excites the solid-state laser medium, and a condensing optical system for condensing the laser beam emitted from the laser light source onto the surface of the solid-state laser medium, wherein the passively Q-switched laser is configured such that the surface of the solid-state laser medium is disposed separate from the condensation position of the laser beam produced by the condensing optical system. A semiconductor laser can be used as the laser light source.

According to such a structure, the power density of the laser beam irradiated onto the surface of the solid-state laser medium decreases and the beam diameter increases. The semiconductor laser that functions as a laser light source has a low output compared with a common gas laser, but even in such a semiconductor laser, the power density of the laser beam can be made to exceed the lasing threshold of the passively Q-switched laser.

Consequently, the peak intensity of the laser beam outputted from a passively Q-switched laser can be significantly improved by increasing the beam diameter when a semiconductor laser is used.

In other words, a unique phenomenon arises in which reducing, rather than increasing, the power density of the inputted laser beam increases the temporal peak intensity of the outputted laser beam. Since the peak intensity of the outputted laser beam can be significantly improved when a semiconductor laser is used, the entire apparatus can be miniaturized.

Since the temporal peak intensity is saturated at a pump area of $0.38 \text{ mm}^2$ or greater when a semiconductor laser is used, the peak intensity output of the passively Q-switched laser can be stabilized and used in this area.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

A passively Q-switched laser relating to the embodiments is described below. Identical symbols are used for identical elements, and redundant explanations are omitted.

Figure 1:
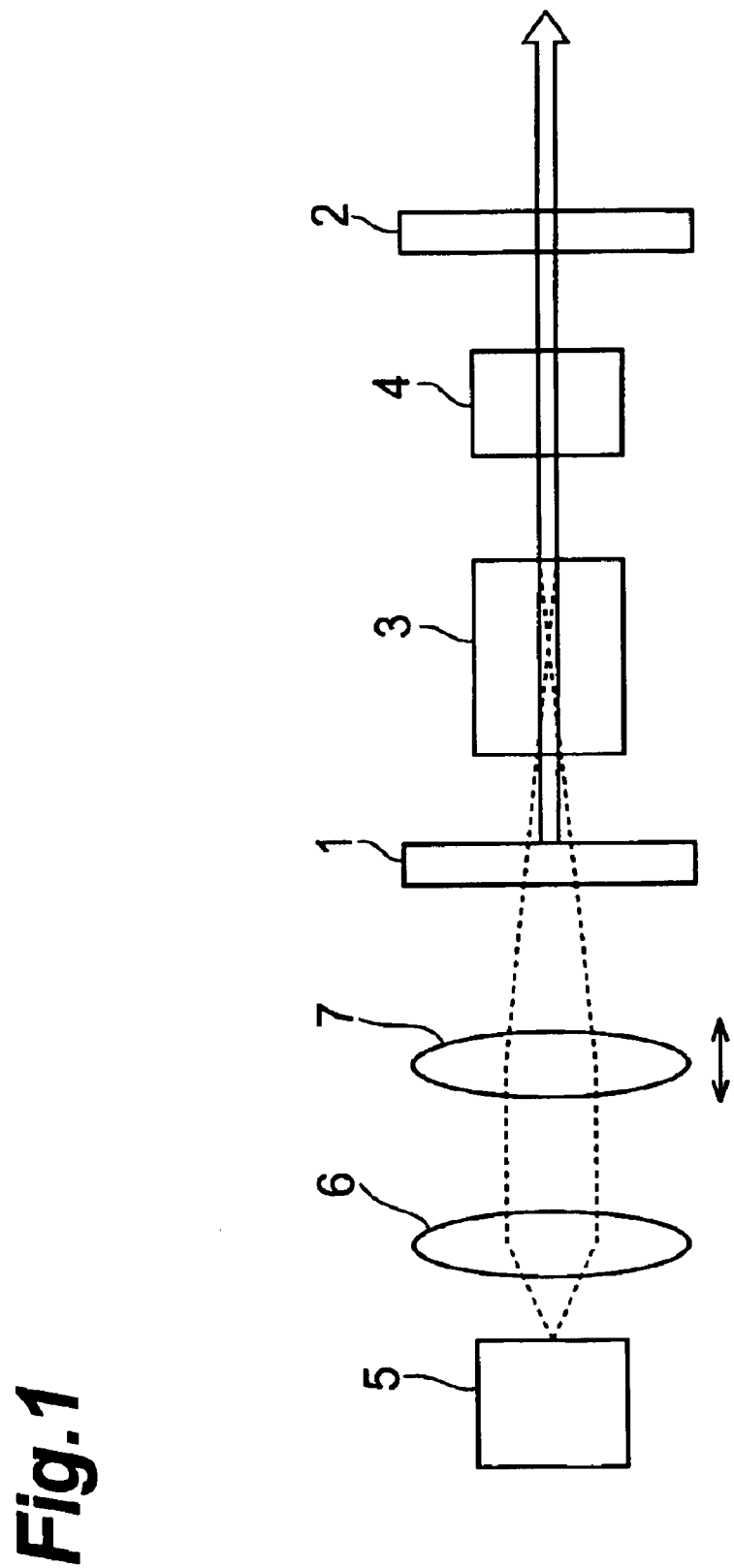
FIG. 1 is an explanatory diagram of a passively Q-switched laser relating to the present invention.

FIG. 1 is an explanatory diagram of a passively Q-switched laser relating to the embodiments This passively Q-switched laser comprises a solid-state laser medium (Nd:YAG) 3 disposed between a pair of reflective mirrors 1 and 2 that constitute a resonator, a host crystal (Cr$^{4+}$:YAG: saturable absorber) 4 for absorbing the fluorescence generated from the solid-state laser medium 3 in the resonator and increasing transmittance in accordance with the absorption, and a semiconductor laser (laser light source) 5 for emitting a laser beam that excites the solid-state laser medium 3.

The excitation laser beam (excitation light) from the semiconductor laser 5 is condensed in the plane (surface) of incidence of the laser beam from the solid-state laser medium 3 by lenses 6 and 7. The upstream lens 6 is a collimating lens that controls divergence of the laser beam emitted from the semiconductor laser 5, converts the beam into parallel light, and emits the light. The downstream lens 7 is a condensing lens that condenses the collimated incident laser beam. In this optical system, the laser beam condenses at the focal point of the condensing lens 7. Specifically, the focal point of the condensing lens 7 is aligned with the condensing point of the laser beam from the condensing optical systems 6 and 7. The condensing point of the laser beam is located even further when no collimating lens 6 is present.

In this arrangement, the positioning of the plane of incidence of the laser beam in the solid-state laser medium 3 is out of alignment with the condensing point of the laser beam from the condensing optical systems 6 and 7 along the direction of the optical axis. Consequently, a laser beam with an uncommonly large diameter is directed to the surface of the solid-state laser medium 3. The excitation laser beam with a large diameter from the semiconductor laser 5 enters the solid-state laser medium 3 after sequentially passing through the lenses 6 and 7 and the reflective mirror (wavelength selection mirror (AR (anti-reflection) coating: 808 nm, HR (high reflection) coating; 1064 nm) 1, whereupon the solid-state laser medium 3 naturally emits light (fluorescence). This light is directed to the host crystal 4 and is absorbed by the host crystal 4.

As the light is absorbed, the electron concentration in the excitation levels of the host crystal 4 increases. As the electron concentration increases, the host crystal 4 becomes transparent and transmittance increases. The light emitted from the solid-state laser medium 3 is repeatedly reflected between the reflective mirrors 1 and 2, and at a certain point stimulated emission occurs in the solid-state laser medium 3 and the laser beam is outputted to the exterior via the reflective mirror (partially reflective mirror) 2.

Figure 2A:
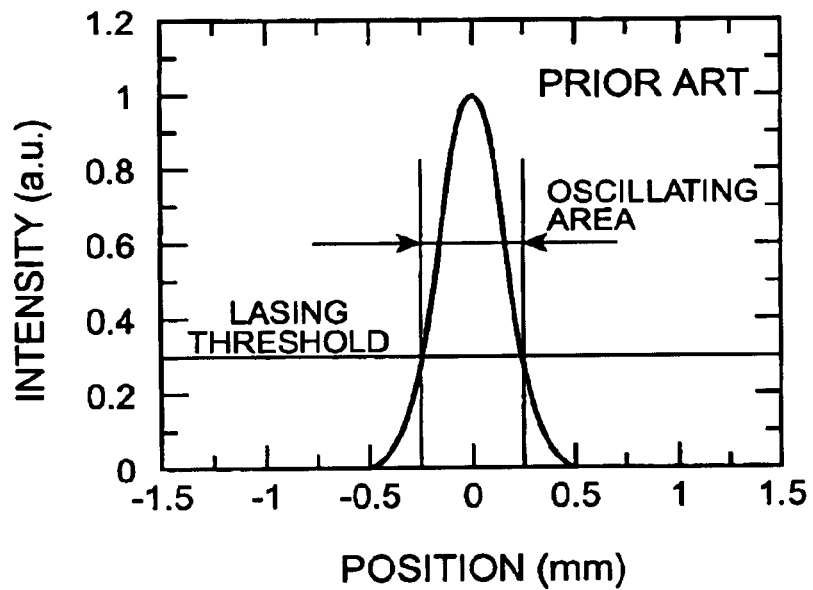
FIG. 2A is a graph depicting laser beam intensity distribution in the plane of incidence of a laser beam in a solid-state laser medium 3.
Figure 2B:
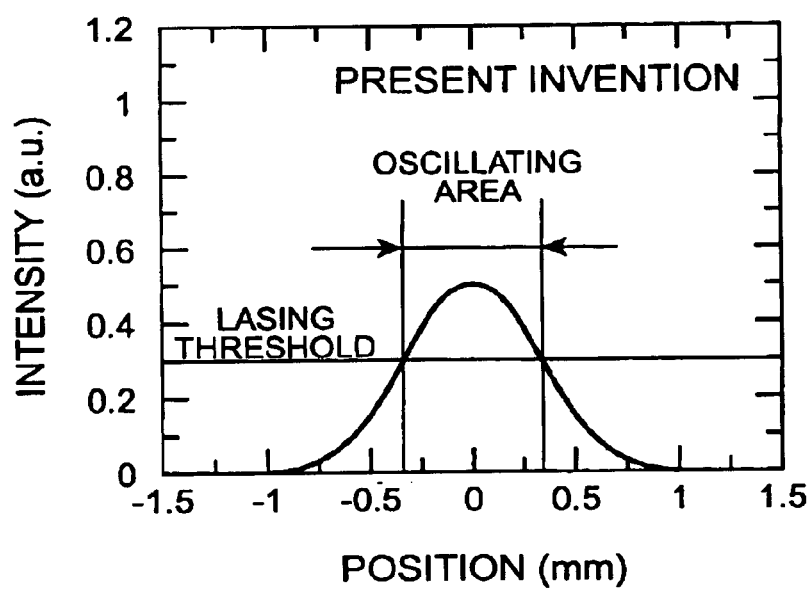
FIG. 2B is a graph depicting laser beam intensity distribution in the plane of incidence of a laser beam in a solid-state laser medium 3.

FIG. 2A is a graph depicting laser beam intensity distribution in the plane of incidence of a laser beam in a solid-state laser medium 3, and FIG. 2B is a graph depicting laser beam intensity distribution in the plane of incidence of a laser beam in a solid-state laser medium 3.

The spatial laser beam peak intensity on the surface of the solid-state laser medium 3 is less when the position of the plane of incidence of the laser beam in the solid-state laser medium 3 is out of alignment with the condensing point of the laser beam from the condensing optical systems 6 and 7 along the direction of the optical axis (FIG. 2B) compared with the case in which they are equivalent (FIG. 2A), and the equivalent beam diameter (pump area) shown in the graph increases.

The semiconductor laser 5 that functions as a laser light source has a low output compared with a common gas laser, but even in such a semiconductor laser, the laser beam intensity in the center can be made to exceed the lasing threshold of the passively Q-switched laser.

Consequently, the entire power of the laser beam outputted from the passively Q-switched laser is increased and the temporal peak intensity is markedly improved by increasing the beam diameter when a semiconductor laser 5 is used.

In other words, a unique phenomenon arises in which reducing, rather than increasing, the power density of the inputted laser beam increases the temporal peak intensity of the outputted laser beam. Since the temporal peak intensity of the outputted laser beam can be significantly improved when a semiconductor laser is used, the entire apparatus can be miniaturized. The semiconductor laser 5 of the passively Q-switched laser of the present embodiment is pulse-driven.

Since the temporal peak intensity is saturated at a laser beam irradiation area of 0.38 mm$^2$ or greater when the semiconductor laser 5 is used, the peak intensity output of the passively Q-switched laser can be stabilized and used in this area.

In the configuration described above, the host crystal 4 is disposed downstream of the solid-state laser medium 3, but it is also acceptable to share the solid-state laser medium 3 and host crystal 4 by placing an additive-free YAG crystal upstream of the solid-state laser medium 3, creating the reflective mirrors 1 and 2 that constitute the resonator from a coating film, or adding Nd and Cr to the same YAG crystal.

Nd-doped YLF, Yb-doped YAG, or the like can be used as the solid-state laser medium 3. Various possibilities are being considered for the combination of the solid-state laser medium 3 and host crystal 4 (crystal that is transparent to the fluorescence generated from the solid-state laser medium 3).

For example, Cr$^{4+}$-doped GSGG may be used as the host crystal 4 for an Nd-doped laser in which the emitted laser wavelength of the solid-state laser medium 3 is in the 1-$\mu$m band, U$^{2+}$-doped CaF$_2$ may be used for an Yb-doped laser whose emitted laser wavelength is in the 0.98-$\mu$m band, and Er$^{3+}$-doped CaF$_2$ may be used for an Er-doped laser whose emitted laser wavelength is in the 1.5-$\mu$m band. Cr$^{4+}$-doped Y$_3$Al$_5$O$_{12}$ or the like can also be used as the host crystal 4. A suitable AR coating may also be applied to the solid-state laser medium 3.

Embodiments

The above-mentioned passively Q-switched laser was manufactured by way of trial and the characteristics thereof were evaluated.

(Experimental Conditions)

The elements used in the experiment were as follows: the maximum value of the drive current pulse supplied to the semiconductor laser 5 was 40 A (temporal peak intensity of the excitation laser beam: 25 W), the cycle frequency of the drive current pulse was 100 Hz (pulse width: 500 μs), and the duty ratio was 5%.

TABLE I

| Semiconductor laser 5: | |
| --- | --- |
| Active Layer Material: | AlGaAs |
| Emitted Light Wavelength: | 808 nm |
| Solid-State Laser Medium 3: | |
| Host Material: | $Y_3Al_5O_{12}$ |
| Dopant: | $Nd^{34}$ |
| Dopant Concentration: | 1.4 at % |
| Fluorescence Wavelength: | 1064 nm |
| Host Crystal 4: | |
| Host Material: | $Y_3A_5O_{12}$ |
| Dopant: | $Cr^{41}$ |
| Absorption Waveband: | 1064 nm ± 250 nm |
| Initial Transmittance: | 30% |
| Reflective Mirror 1: | |
| Reflectivity: | 99.9% (wavelength: 1064 nm) |
| Transmittance: | 99.9% (wavelength: 808 nm) |
| Reflective Mirror 2: | |
| Reflectivity: | 60% (wavelength: 1064 nm) |

(Results of Experiment)

The peak intensity of the laser beam outputted from the passively Q-switched laser was determined by measuring pulse energy with a power meter, measuring pulse width with an oscilloscope, and calculating the pulse energy/pulse width ratio.

Figure 3:
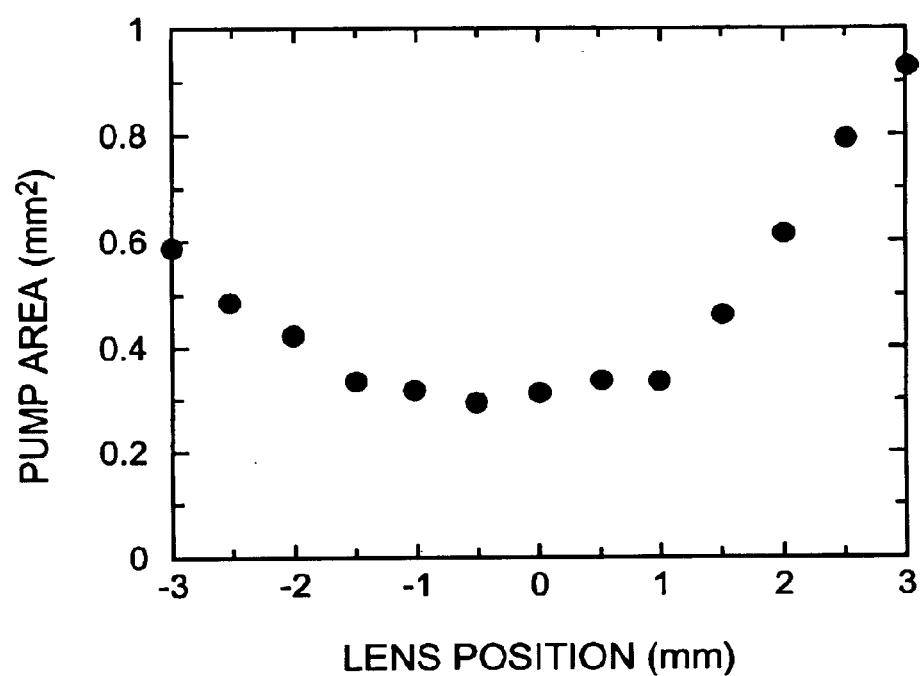
FIG. 3 is a graph depicting the relationship between the position (mm) (in the direction or the optical axis) of a condensing lens 7 for condensing the laser beam outputted from a semiconductor laser 5 and the excitation laser beam irradiation area (pump area) ($\text{mm}^2$) in the plane of incidence of the laser beam in the solid-state laser medium 3.

FIG. 3 is a graph depicting the relationship between the position (mm) (in the direction of the optical axis) of the condensing lens 7 for condensing the laser beam outputted from the semiconductor laser 5 and the excitation laser beam irradiation area (pump area) ($mm^2$) in the plane of incidence of the laser beam in the solid-state laser medium 3. The pump area increases when the position of the condensing lens 7 in the direction of the optical axis is out of alignment in relation to the lens position (at 0 mm) that provides a laser beam condensing point.

Figure 4A:
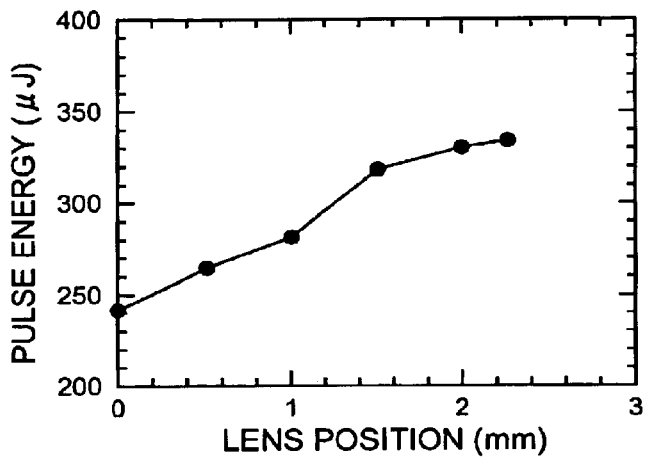
FIG. 4A shows a graph depicting the relationship between the position (mm) of the condensing lens 7 in the direction of the optical axis and the pulse energy ($\mu J$) of the laser beam outputted from the passively Q-switched laser.
Figure 4B:
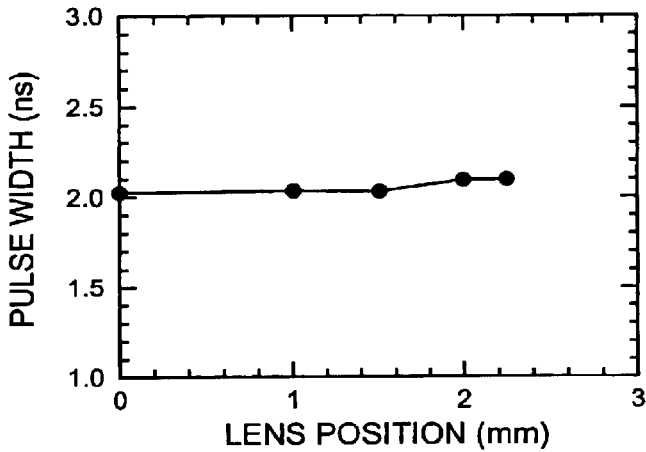
FIG. 4B shows a graph depicting the relationship between the position (mm) of the condensing lens 7 in the direction of the optical axis and pulse width (ns) of the laser beam outputted from the passively Q-switched laser.
Figure 4C:
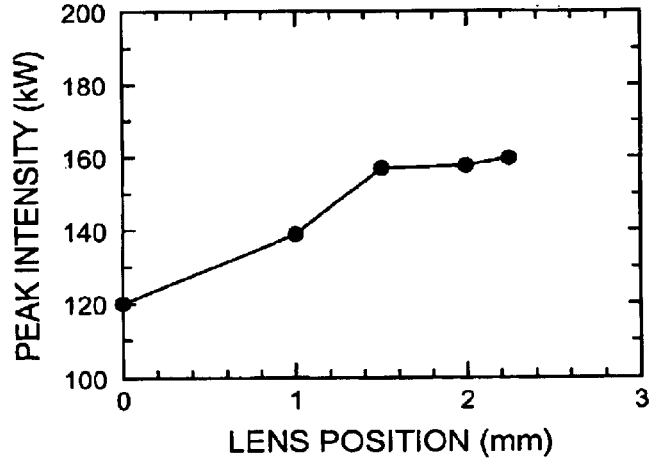
FIG. 4C shows a graph depicting the relationship between the position (mm) of the condensing lens 7 in the direction of the optical axis and the temporal peak intensity (kW) of the laser beam outputted from the passively Q-switched laser.

FIG. 4 shows graphs depicting the relationship between the position (mm) of the condensing lens 7 in the direction of the optical axis and the pulse energy (μJ), pulse width (ns), and temporal peak intensity (kW) of the laser beam outputted from the passively Q-switched laser. When the lens position is misaligned in a direction (forward direction) separated from the solid-state laser medium 3 by 1.5 mm or greater, the temporal peak intensity is saturated, so the peak intensity output of the passively Q-switched laser can be stabilized and used in this area.

Figure 5A:
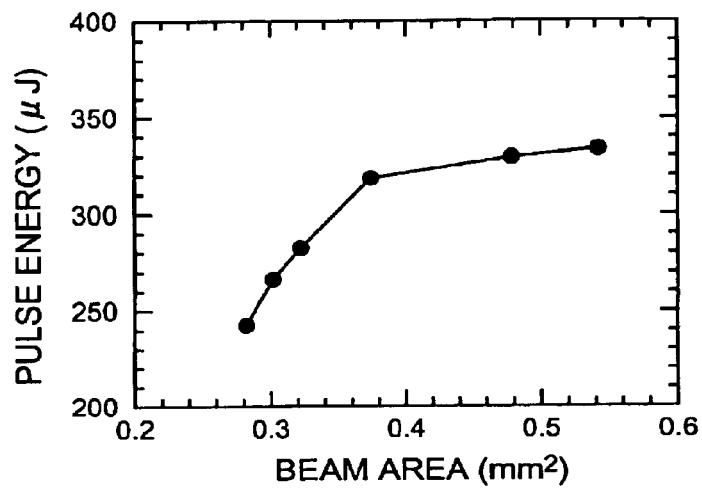
FIG. 5A shows a graph depicting the relationship between the pump area (beam area) (mm$^2$) in the plane of incidence of the laser beam and the pulse energy ($\mu$J) of the laser beam outputted from the passively Q-switched laser.
Figure 5B:
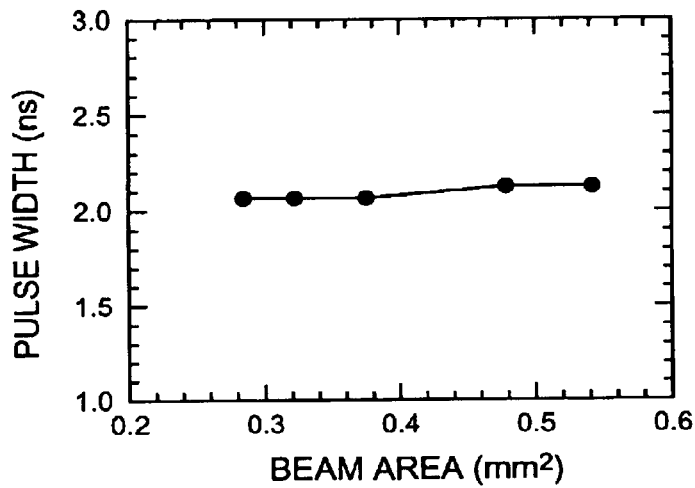
FIG. 5B shows a graph depicting the relationship between the pump area (beam area) (mm$^2$) in the plane of incidence of the laser beam and the pulse width (ns) of the laser beam outputted from the passively Q-switched laser.
Figure 5C:
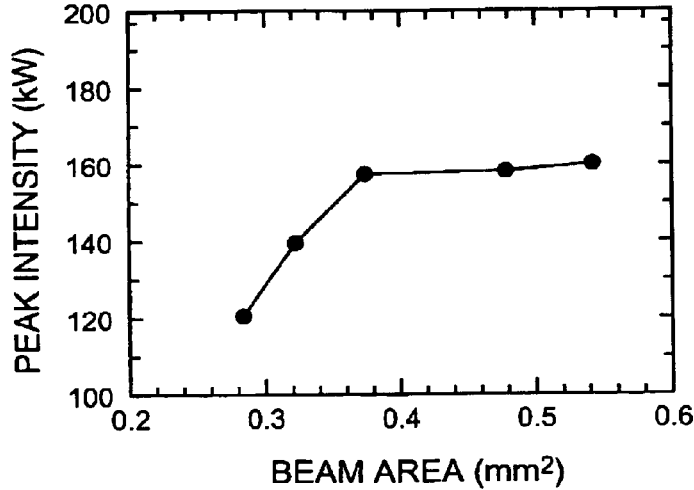
FIG. 5C shows a graph depicting the relationship between the pump area (beam area) (mm$^2$) in the plane of incidence of the laser beam and a temporal peak intensity (kW) of the laser beam outputted from the passively Q-switched laser.
Figure 6:
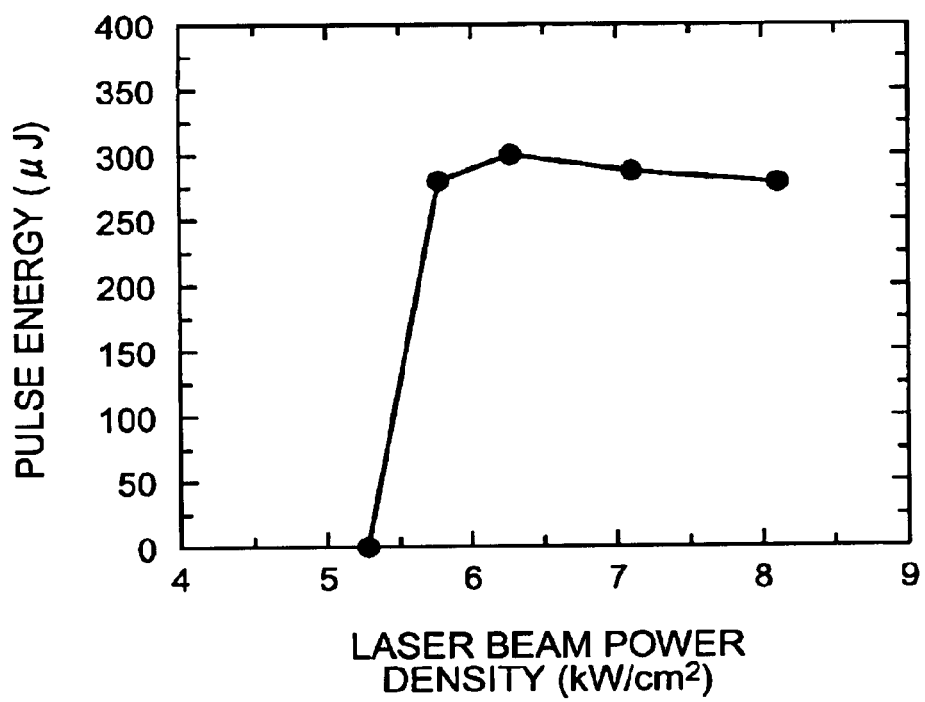
FIG. 6 is a graph depicting the relationship between laser beam power density (kW/cm$^2$) and pulse energy ($\mu$J) when the plane of incidence of the laser beam is aligned with the focal point of the lens.

FIGS. 5A, 5B and 5C show graphs depicting the relationship between the pump area ($mm^2$) in the plane of incidence of the laser beam and the pulse energy (μJ), pulse width (ns), and temporal peak intensity (kW) of the laser beam outputted from the passively Q-switched laser. When the pump area is 0.38 $mm^2$ or greater, the temporal peak intensity is saturated, so the peak intensity output of the passively Q-switched laser can be stabilized and used in this area.

As shown above, the temporal peak intensity of the laser beam output in the passively Q-switched laser of the present embodiment can be increased by 33% in comparison with cases in which the plane of incidence of the laser beam is disposed at the condensing point. Pulse energy was increased by 37%. Such a passively Q-switched laser can be configured to the size of a microchip and used in technological fields such as optic communications.

The peak intensity of the laser beam output can be increased in the passively Q-switched laser of the present invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A passively Q-switched laser, comprising:

a solid-state laser medium disposed between a pair of reflective mirrors that constitute a resonator;

a host crystal of a saturable absorber, arranged in said resonator;

a laser light source for emitting a laser beam that excites the solid-state laser medium; and a condensing optical system for condensing the laser beam emitted from the laser light source, wherein the surface of the solid-state laser medium is disposed off the condensation position of the laser beam produced by the condensing optical system, whereby a unique phenomenon arises in which reducing, rather than increasing, the power density of the input laser beam increases the temporal peak intensity of the output laser beam.

2. The passively Q-switched laser according to claim 1, wherein said laser light source comprises a semiconductor laser.

3. The passively Q-switched laser according to claim 2, wherein the laser beam irradiation area on the surface of the solid-state laser medium is 0.38 $mm^2$ or greater.

* * * * *